April 25, 1950  W. SIEGERIST  2,505,215
MOUNTING FOR SHEAVES AND THE LIKE
Filed April 30, 1945  2 Sheets-Sheet 1
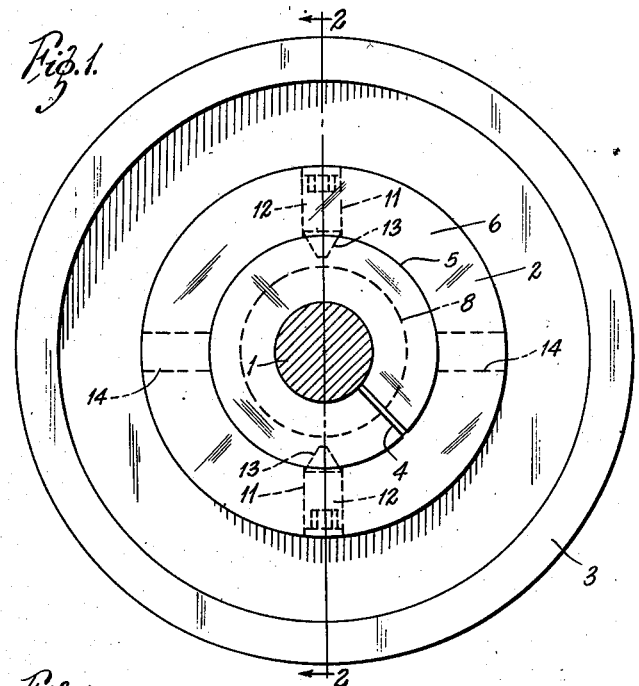
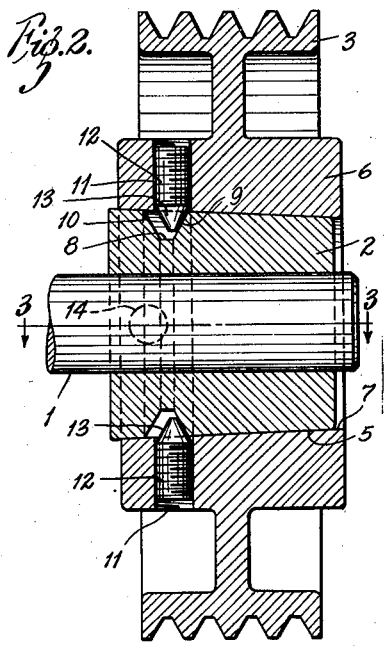
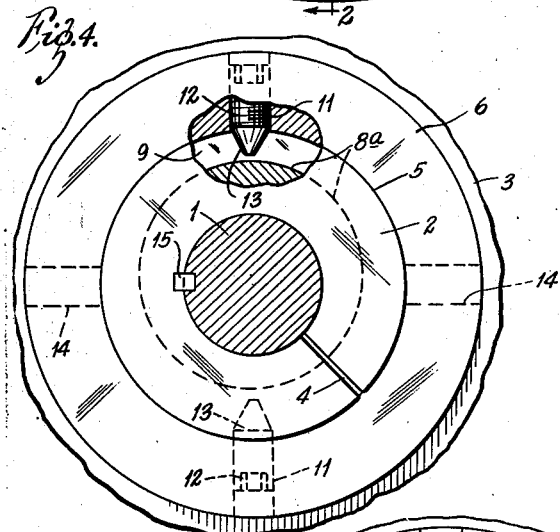
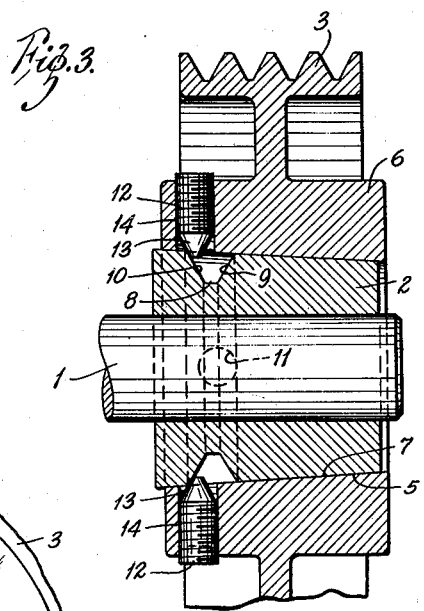
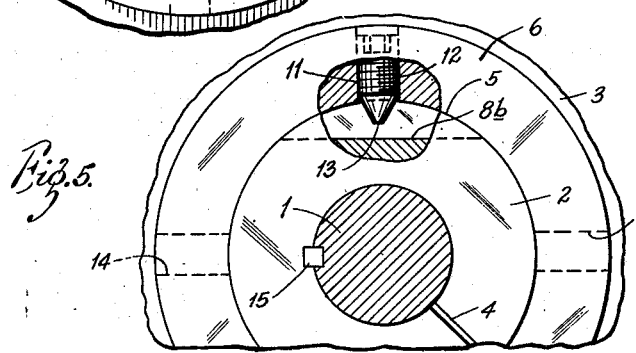
INVENTOR:
Walter Siegerist
by Carr+Carr+Gravely
HIS ATTORNEYS.

April 25, 1950 W. SIEGERIST 2,505,215
MOUNTING FOR SHEAVES AND THE LIKE
Filed April 30, 1945 2 Sheets-Sheet 2
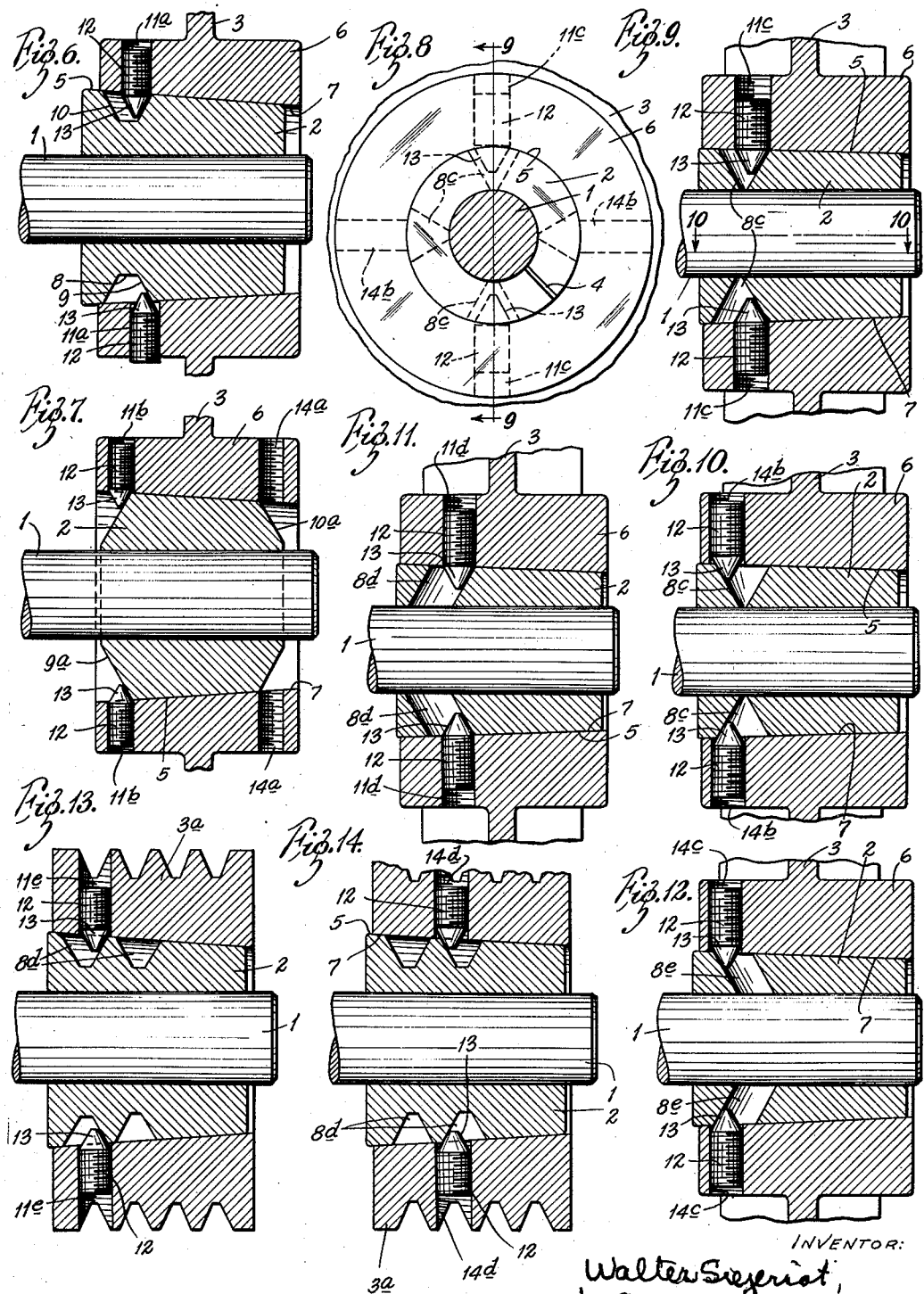
INVENTOR:
Walter Siegerist,
by Carr+Carr Bravely,
HIS ATTORNEYS Patented Apr. 25, 1950

2,505,215

UNITED STATES PATENT OFFICE 2,505,215

MOUNTING FOR SHEAVES AND THE LIKE

Walter Siegerist, University City, Mo.

Application April 30, 1945, Serial No. 590,978

2 Claims. (Cl. 287—52.06)

This invention relates to the mounting of sheaves, gears, sprocket wheels and other rotary power transmission members on their shafts. A common mounting means for such rotary transmission members includes a longitudinally split bushing having a tapered seat to fit within the tapered bore of the transmission member and having a peripheral flange adjacent to the large end of said seat, and screws passing through said member and said flange parallel to the shaft axis, whereby said member may be drawn tight on the tapered seat portion of the bushing and the bushing itself contracted against the shaft. In some of such mountings, the transmission member has extra longitudinal screw holes therein through which the locking screws are threaded and brought into endwise engagement with the peripheral flange of the bushing to dismount said member from the tapered seat portion of said bushing.

With such mountings, when the hub length of the transmission member is equal to or greater than the face width thereof, the flange at the end of the bushing must be located outside of the corresponding end of said member, thereby leaving the flange and the screws exposed to damage, giving the mounting an unsymmetrical external appearance, and preventing the use of the mounting on shafts wherein the space available for the bushing corresponds to the face width of said member. Such mountings are also unsuitable for use with small diameter transmission members, because the peripheral flange of the bushing is of larger diameter than the transmission member and is thus liable to interfere with the operation thereof.

The principal objects of the present invention are to provide a simple and compact, strong and durable, easily mountable and demountable mounting of the above type that will dispense with the flange on the bushing and thus obviate the above noted difficulties, that will provide for increasing the locking action upon relative rotary movement of the transmission member and bushing, and that will have other advantages hereinafter appearing.

The invention consists principally in providing the transmission member with radially disposed screws that are adapted to bear against beveled surfaces on the bushing to cause relative endwise movement of the member and bushing to tighten said member on the tapered seat of the bushing and to release it therefrom. The invention further consists in the mounting for the transmission member and in the parts and combinations and arrangements of parts hereinafter described and claimed.

In the accompanying drawings, which form part of this specification and wherein like symbols refer to like parts wherever they occur, Fig. 1 is an end elevational view of a sheave provided with a mounting embodying my invention, Fig. 2 is a central longitudinal section on the line 2—2 in Fig. 1, Fig. 3 is a central longitudinal section on the line 3—3 in Fig. 2, showing the use of the screws to remove the sheave from the bushing, Fig. 4 is an end elevational view showing a modified form of the invention, Fig. 5 is a similar view showing another modification of the invention, Fig. 6 is a central longitudinal sectional view showing another form of the invention, Fig. 7 is a view similar to Fig. 6 showing another modification of the invention, Fig. 8 is an end elevational view showing another modified form of the invention, Fig. 9 is a central longitudinal section on the line 9—9 in Fig. 8, Fig. 10 is a central longitudinal section on the line 10—10 in Fig. 9, showing the screws mounted in the unlocking holes of the sheave, Figs. 11 and 12 are central longitudinal sectional views illustrating another form of the invention; and Figs. 13 and 14 are central longitudinal sectional views illustrating a further modification of the invention.

In Figs. 1, 2 and 3, my invention is shown embodied in a sheave mounting comprising a shaft 1, a bushing 2 mounted on said shaft and a sheave 3 mounted on said bushing. The bushing 2 is split longitudinally, as at 4, from end to end along one side thereof and has a tapered outer peripheral surface or seat 5 extending from end to end thereof. The hub 6 of the sheave or other rotary power transmission member 3 has a tapered axial bore 7 fitting on the tapered seat 5 of the bushing 2, said hub and bushing being of substantially the same length.

An annular groove 8 with inwardly converging side walls 9 and 10 is formed in the tapered seat portion 5 thereof concentric therewith near the large end thereof. The corresponding end portion of the hub 6 of the sheave 3 or other power transmission member has one or more screw threaded locking holes 11 extending radially through said hub. In the construction illustrated, the hub 6 of the sheave 3 is shown provided with two axially alined diametrically opposed locking holes 11 adapted to receive hollow or socket-head set screws 12 with cone point ends 13. The locking or mounting screw holes 11 are located so that the pointed ends 13 of the screws 12 therein are in position to bear against the inclined side wall or annular shoulder 9 only of the external V-shaped annular groove 8 in the bushing 2 when the tapered portion 5 of said bushing is seated in the tapered bore 7 in the hub 6 of the sheave 3, the side wall 9 being the one located farthest from the large end of said bushing. As shown in Fig. 3, the hub 6 of the sheave 3 also has a second set or pair of axially alined diametrically opposed unlocking or dismounting holes 14 that are the same size as the locking holes 11, but are offset therefrom circumferentially of the hub and longitudinally thereof in the direction of its large end so that the screws 12 are adapted, when threaded into the unlocking holes with the hub seated tightly on the bushing, to bear radially against the other inclined or beveled side wall or annular shoulder 10 of the annular groove 8 in the bushing 2.

In assembling the above sheave mounting, the split bushing 2 is mounted on the shaft 1 and the hub 6 of the sheave 3 is fitted on the tapered seat 5 of said bushing. In this position of the parts, the set screws 12 are mounted in the locking holes 11 of the hub 6 of the sheave 3 and bear endwise against the inclined side wall 9 of the annular groove 8 in the tapered seat portion 5 of the bushing 2. With the parts thus positioned, tightening of the screws 12 in the locking or mounting holes 11 causes the pointed ends 13 of said screws to bear against the inclined side wall 9 of the annular groove 8 and thus causes relative endwise movement of the bushing 2 and hub 6 in a direction which will draw the hub tight on the tapered seat portion 5 of the bushing and contract the latter so as to tightly grip the shaft 1. Thus, the sheave 3, bushing 2 and shaft 1 are rigidly locked together by the friction of the tapered surfaces and the holding power of the screw 12. In disassembling the sheave mounting, the screws 12 are removed from the locking holes 11 in the hub 6 and threaded into the unlocking holes 14 thereof which are in position to cause the pointed ends 13 of the screws 12 to engage the other oppositely inclined side wall 10 of the annular groove 8 and cause relative endwise movement of the bushing and sheave in a direction which will break the tight fit of the split tapered bushing 2 in the hub of the sheave and release the grip of said bushing on the shaft 1.

The construction illustrated in Fig. 4 is similar to that shown in Figs. 1, 2 and 3, except that the annular screw receiving groove 8a in the bushing 2 is disposed slightly eccentric thereto. With this arrangement, if the screws 12 are not fully advanced in the locking holes 11, any slight rotation of the sheave 3 relative to the bushing due to the driving power causing such movement causes the pointed end 13 of one of the two diametrically opposed locking screws 12 to move deeper into the eccentric annular groove 8a, thereby firmly locking the complete sheave and hub assembly. This arrangement also permits the operator to rock the hub and sheave assembly as a unit back and forth on the shaft while slipping the assembly in place. This eccentric groove arrangement is preferable for use with large diameter power transmission members. The mounting bushing for said large size power transmission members may also be secured to the shaft 1 by means of a torque transmitting key 15. However, the driving key may be dispensed with in the case of smaller sheaves, gears and the like.

As shown in Fig. 5, a construction equivalent to the eccentric groove construction may be provided by means of a straight V-shaped groove 8b formed in the tapered seat 5 of the bushing 2 crosswise of the axis thereof, relative rotary movement of the sheave and bushing causing the pointed end of the screw 12 to extend deeper into the groove 8b and thus pull the bushing further into the tapered bore of the sheave.

In cases where a longer relative axial movement of the bushing 2 and sheave hub 6 is desired to lock them together, the two diametrically opposed threaded locking holes 11a in said hub are, as shown in Fig. 6, offset longitudinally thereof so that when the screw 12 in the hole closest to the large end of the bushing is bottomed in the annular groove 8, the screw in the other hole is in position to engage the side wall 9 and cause a further relative endwise locking movement of said hub and bushing.

In the construction shown in Fig. 7, the tapered mounting bushing 2 terminates at its large end in a tapered or conical end face 9a and at the opposite end in a tapered or conical end face 10a. The hub portion 6 of the sheave 3 has one or more radial screw-threaded locking holes 11b therein adjacent to the large end of the tapered bore thereof; and these holes are located so that the pointed ends 13 of the screws 12 therein will bear against the inclined or beveled surface 9a at the large end of the bushing and thus cause relative endwise movement of the bushing and hub in a direction that will seat the hub tightly on the tapered seat 5 of the bushing and cause the latter to firmly grip the shaft 1. The hub 2 is also provided adjacent to the small end of the axial bore thereof with one or more unlocking holes 14a. In the locked position of the parts, the unlocking holes 14a are positioned so that the screws 12 when threaded therein will engage the tapered end 10a of the bushing 2 and break the tight fit between the hub and bushing and release the latter from the shaft.

In the construction shown in Figs. 8, 9 and 10, the bushing 2 is provided near the large end thereof with one or more inwardly tapering conical holes 8c; and the hub 6 of the sheave 3 is provided with one or more radial screw threaded locking holes 11c and one or more similar unlocking holes 14b. The two sets of holes are offset longitudinally of the hub 6 at such distance that the screws 12, when threaded into the locking holes 11c, will bear against one side of the conical holes 8c in the bushing and bind the latter in the bore of the hub, while said screws, when threaded through the unlocking holes 14b, will bear against the opposite sides of said conical holes and break the tight fit of the hub on the tapered seat of the bushing. This construction is particularly adapted for use in constructions wherein the bushing is thin and a continuous annular groove therein would tend to reduce the strength thereof.

In the construction shown in Figs. 11 and 12, the hub 6 has screw-threaded radial locking and unlocking holes 11d and 14c offset longitudinally of said hub; and the bushing 2 has locking holes 8d located opposite the locking holes 11d in the hub 6 and has unlocking holes 8e located opposite the unlocking holes 14c in said hub. The holes 8d and 8e in the bushing 2 are disposed at reverse oblique angles to the axis thereof, whereby the screws 12, when engaged with the locking holes 11d in the hub, are adapted to bear against one side of the inclined locking holes 8d of the bushing and thus clamp the parts together, and said screws, when engaged with the unlocking holes 14c in said hub are adapted to bear against the opposite sides of the oppositely inclined unlocking holes 8e in said bushing and thus release said parts.

In the modification shown in Figs. 13 and 14, the power transmission member is shown in the form of a solid, hubless multiple groove sheave 3a and the locking holes 11e are located in the bottom of the belt groove at the large end of the tapered bore in said sheave, while the unlocking holes 14d are located in the bottom of the next adjacent belt groove. The mounting bushing is provided near its large end with two axially spaced V-shaped annular grooves 8d. The spacing of the grooves 8d is such that, when the tapered bore of the sheave seats on the tapered seat of the bushing, the locking holes 11e will be located opposite one of the annular grooves 8d and the unlocking holes 14d will be located opposite the other of said annular grooves. Thus, when the screws 12 are inserted in the locking holes 11e the pointed ends of the screws will bear against one side wall of a groove 8d and tightly draw the sheave and bushing together, while said screws, when tightened in the unlocking holes 14d will engage the other side wall of the other groove 8d and force the sheave and bushing apart endwise.

My invention has a number of practical advantages. It provides easily accessible radially disposed screws for causing relative endwise movement of the power transmitting member and the bushing to lock and unlock the mounting; it dispenses with the need for the outstanding circumferential flange on the end of the bushing; it reduces the over-all length of the mounting; it enables the mounting to be applied to shafts wherein the space available for the bushing is substantially the same as the face width of the transmission member; and it gives the mounting a symmetrical external appearance. It also permits the bushing and sheave or other transmission member to be handled, shipped and applied to and removed from the shaft as a loosely pre-assembled unit.

Obviously, numerous changes may be made without departing from the invention and I do not wish to be limited to the precise construction shown and described.

What I claim is:

1. A sheave or like mounting comprising a sheave or the like having a tapered axial bore and a bushing having a tapered seat fitting within said bore, said bushing having a recess therein with two opposed beveled faces spaced apart longitudinally of said bushing and disposed at reverse oblique angles to the axis thereof, and a member mounted in said sheave and movable crosswise of the axis thereof into selective engagement with each of said beveled faces to thereby effect relative endwise movement of said sheave and bushing in one direction to draw said sheave tight on said tapered seat of said bushing and in the other direction to break the tight fit of said sheave and bushing, said recess comprising an external annular groove formed in said bushing eccentric to the longitudinal axis thereof and having side walls that converge toward the bottom of said eccentric annular groove and form the two beveled faces of said bushing.

2. A sheave or like mounting comprising a sheave or the like having a tapered axial bore, a bushing having a tapered seat fitting within said bore, said bushing having an external annular groove formed therein eccentric to the longitudinal axis thereof whose side walls converge toward the bottom thereof, and a member mounted on said sheave and extending into the tapered axial bore thereof for selective engagement with either one of said converging side walls of said eccentric groove, whereby rotary movement of said sheave relative to said bushing with said member in engagement with one of said converging side walls of said eccentric groove will cause relative axial movement of said sheave and bushing in one direction to draw said sheave tight on said tapered seat on said bushing and rotary movement of said sheave relative to said bushing with said member in engagement with the other of said converging side walls of said eccentric groove will cause relative axial movement of said sheave and bushing in the opposite direction to break the tight fit of said sheave and bushing.

WALTER SIEGERIST.

REFERENCES CITED

The following references are of record in the file of this patent:

UNITED STATES PATENTS

| Number | Name | Date |
| --- | --- | --- |
| 1,191,313 | Johnston | July 18, 1916 |
| 1,661,226 | Martin | Mar. 6, 1928 |
| 2,098,709 | Murden et al. | Nov. 9, 1937 |